United States Patent [19]

Bickle et al.

[11] Patent Number: 4,624,887

[45] Date of Patent: Nov. 25, 1986

[54] MATERIAL FOR SLIDING SURFACE BEARINGS

[75] Inventors: Wolfgang Bickle, Reilingen; Rolf Pfoh, Rauenberg; Karl Becker, St. Leon-Rot, all of Fed. Rep. of Germany

[73] Assignee: Kolbenschmidt AG, Neckarsulm, Fed. Rep. of Germany

[21] Appl. No.: 827,132

[22] Filed: Feb. 6, 1986

[30] Foreign Application Priority Data

Feb. 16, 1985 [DE] Fed. Rep. of Germany ....... 3505373

[51] Int. Cl.$^4$ .............................................. B32B 7/00
[52] U.S. Cl. .................... 428/256; 308/3 R; 308/DIG. 8; 427/201; 427/247; 427/375; 427/409; 428/283; 428/334; 428/335; 428/402; 428/422
[58] Field of Search ............. 428/109, 131, 247, 256, 428/283, 334, 335, 336, 421, 422, 402; 427/201, 247, 375, 409; 308/241, 3 R, DIG. 8

[56] References Cited

U.S. PATENT DOCUMENTS

| | | | |
|---|---|---|---|
| 3,950,599 | 4/1976 | Board ................................. | 428/422 |
| 4,156,049 | 5/1979 | Hodes et al. ........................ | 428/422 |
| 4,208,472 | 6/1980 | Cho et al. ........................... | 428/256 |
| 4,238,137 | 12/1980 | Furchak et al. .................... | 428/422 |
| 4,439,484 | 3/1984 | Mori .................................. | 428/422 |
| 4,559,248 | 12/1985 | Sumiyoshi et al. ................ | 428/256 |

FOREIGN PATENT DOCUMENTS 0001395 1/1979 Japan .

*Primary Examiner*—James J. Bell
*Attorney, Agent, or Firm*—Sprung, Horn, Kramer & Woods

[57] ABSTRACT

A sheet material for sliding surface bearings comprises an expanded metal mesh which consists of a wrought aluminum alloy and is coated with a mixture of polytetrafluoroethylene, filler and glass fibers. The bond strength is increased by coating the surface of the expanded metal mesh with a primer layer.

6 Claims, 3 Drawing Figures

MATERIAL FOR SLIDING SURFACE BEARINGS

BACKGROUND OF THE INVENTION

This invention relates to a sheet material for sliding surface bearings comprising an expanded metal mesh consisting of a wrought aluminum alloy having an elongation at break $\delta_5 = 8$ to 20% and a Brinell Hardness Number HB of 35 to 65 and providing with a coating consisting of 10 to 30 wt. % of a filler for improving the thermal conductivity and wear resistance, 10 to 30 wt. % glass fibers and 40 to 80 wt. % polytetrafluoroethylene (PTFE).

In such a sheet material for sliding surface bearings, which is known from European patent specification No. 40 448, the expanded metal mesh consists particularly of a wrought aluminum alloy of the type AlMgSil or AlMg3 and has a mesh opening size (width × length) of 0.5 to 1 mm to 2 to 3 mm and a land width of 0.3 to 1.0 mm. That material is distinguished in that it can be cut or stamped as desired so that its use in the automatic manufacture of bearings will give rise to no problems. When the layer consisting of the mixture of PTFE, lead, and glass fibers provided on the lands of the expanded metal mesh has been worn off, the expanded metal mesh itself has very good emergency running properties.

In the sheet material for sliding surface bearings which has been described hereinbefore, the coating consisting of the mixture of PTFE, lead and glass fibers may separate from the expanded metal mesh adjacent to those points at which peak stresses arise during the shaping of the material for sliding surface bearings to form bearing elements. As a result, such bearing elements when used in sliding surface bearings exposed to corrosive fluids, such as door hinges or motor vehicles subjected to the action of thawing salt, the expanded metal mesh will be corroded and will thus be coated with coverings which effect an uncontrolled change of the mechanical-technological properties of the expanded metal mesh.

SUMMARY OF THE INVENTION

It is an object of the present invention to ensure that the coating consisting of PTFE, filler and glass fibers will not separate from the expanded metal mesh during the shaping of the material for sliding surface bearings to form bearing elements so that local corrosive will be prevented.

This object is accomplished in that the surface of the expanded metal mesh is coated with a primer layer having a thickness of 2 to 10 micrometers. This results in a substantial improvement of the bond strength of the coating consisting of the mixture of PTFE, filler and glass fibers and in all improved deformability so that the field of application of the sheet material for sliding surface bearings is substantially increased.

In a special embodiment of the invention the primer layer consists of chromium phosphate and of embedded particles of PTFE, which have been sintered to the adjacent PTFE particles of the mixture of PTFE, filler and glass fibers during the sintering of that mixture.

In the process of manufacturing the sheet material for sliding surface bearings, the expanded metal mesh consisting of a wrought aluminum alloy is subjected to the conventional pretreatment and is then coated with a mixture consisting of 90 to 110 parts by weight of a PTFE dispersion, 10 to 30 parts by weight of chromium phosphate and 20 to 50 parts by weight of distilled water, and is subsequently dried at a temperature of 230° to 300° C. for 3 to 8 minutes. The mixture consisting of PTFE, filler and glass fibers is subsequently applied by rolling and is sintered at a temperature of 380° to 410° C. for 4 to 10 minutes. The filler may particularly consist of lead, molybdenum disulfide, barium sulfate and zinc sulfide.

DETAILED DESCRIPTION OF THE INVENTION

The invention will be explained more in detail with reference to an example. An expanded metal mesh was used which consisted of a wrought aluminum alloy of the type AlMgSil and had an ultimate tensile stress $\delta_B = 25$ N/mm$^2$, a 0.2%-offset yield stress $\delta_{0.2} = 13$ N/mm$^2$, an elongation at break $\delta_5 = 18\%$ and a Brinell hardness number HB = 70. The mesh had a mesh opening size of 1 × 2 mm and lands having a width of 0.5 mm. The expanded metal mesh was coated in a thickness of 2 to 5 micrometers with a primer layer composed of 100 parts by weight of a PTFE dispersion, 20 parts by weight of chromium phosphate and 45 parts by weight of distilled water and was dried at 280° C. for five minutes. A mixture consisting of 20 wt. % lead, 20 wt. % glass fibers and 60 wt. % PTFE was applied to the dried layer and was sintered at about 385° C. for 5 minutes. The coating consisting of the mixture of PTFE, lead and glass fibers had a bond strength of 2.6 to 3.0 N/mm$^2$. In a similar but primerless material for sliding surface bearings the bond strength amounted only to 1.14 to 1.35 N/mm$^2$.

Figure 1:
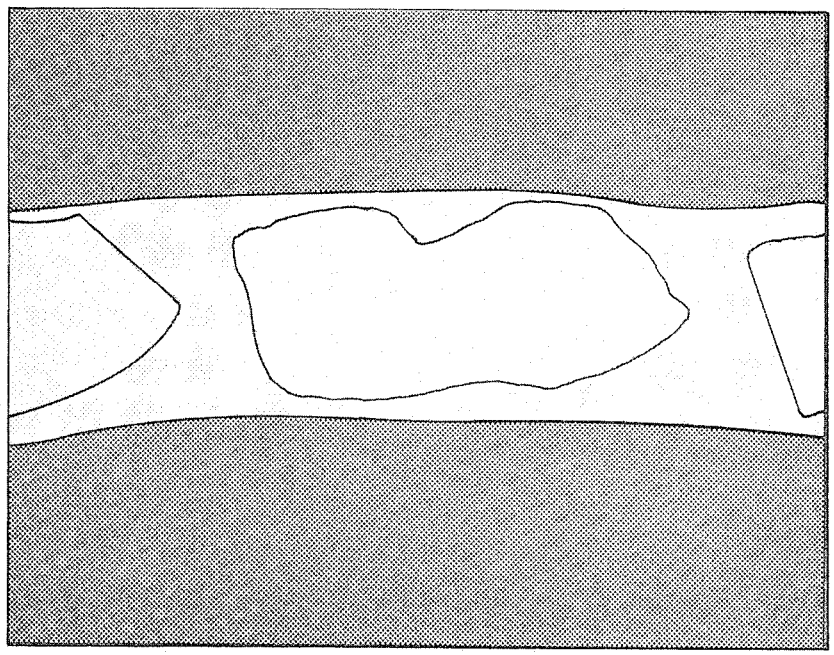
FIG. 1 is a micrograph of the sheet material according to the present invention.
Figure 2:
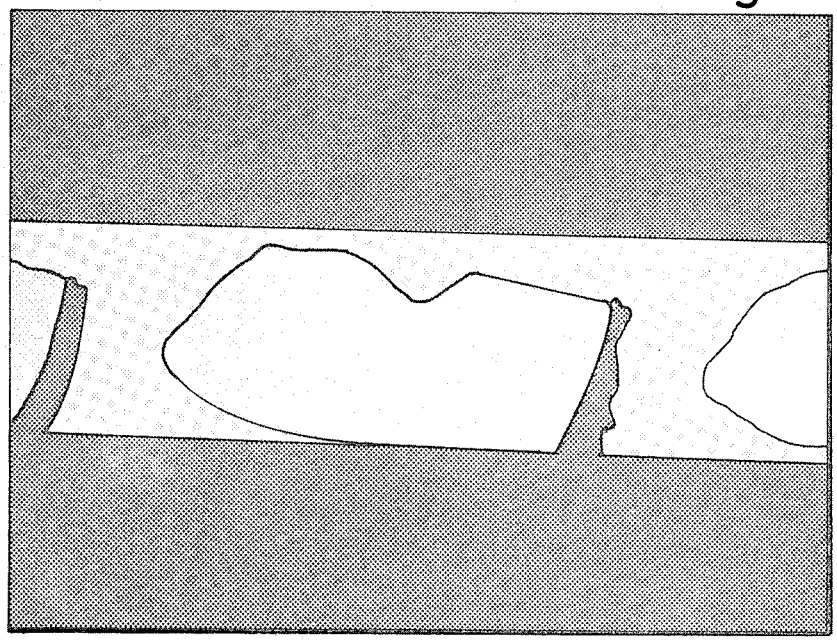
FIG. 2 is a micrograph of prior art sheet material.

A plurality of bushings for collar-oiled bearings were made from the material in accordance with the invention for sliding surface bearings and from the primerless material for sliding surface bearings. The bushings were subjected for 96 and for 244 hours to the salt spray test in accordance with DIN 50 021. From the results it is clearly apparent that the material in accordance with the invention for sliding surface bearing (micrograph of FIG. 1) is clearly superior as regards corrosion in a salt-containing atmosphere to the known primerless material for sliding surface bearings (micrograph of FIG. 2). When a primer is used, the coating consisting of PTFE, lead and glass fibers completely encloses the expanded metal mesh even in the regions in which peak stresses arise as the material is shaped. On the contrary, FIG. 2 shows clearly that the coating has separated from the lands of the primerless expanded metal mesh and that white coverings have been formed by corrosion.

Figure 3:
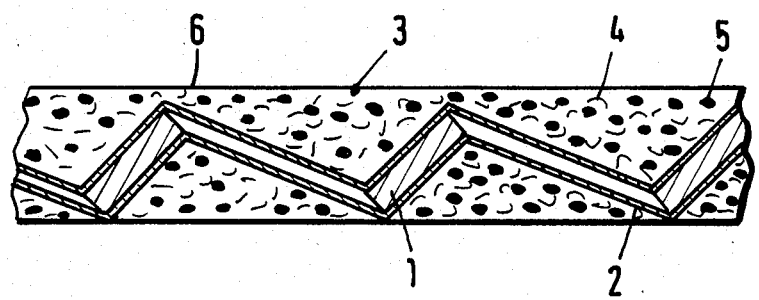
FIG. 3 is a transverse sectional view of the sheet material in accordance with the invention.

FIG. 3 is a transverse sectional view showing the material in accordance with the invention for sliding surface bearings. A primer layer 2 has been applied to both sides of the lands 1 of the expanded metal mesh. The mesh openings of the expanded metal mesh are filled with the mixture consisting of PTFE particles 3, glass fibers 4 and lead powder 5 in such a manner that the mixture forms a bearing layer 6 over the apices of the lands 1.

It will be appreciated that the instant specification and claims are set forth by way of illustration and not limitation, and that various modifications and changes may be made without departing from the spirit and scope of the present invention.

What is claimed is:

1. A sheet material for sliding surface bearings comprising an expanded metal mesh composed of a wrought aluminum alloy having an elongation at break $\delta_5 = 8$ to 20% and a Brinell Hardness Number HB of 35 to 65; a primer layer coating the surface of the expanded metal mesh and having a thickness of 2 to 10 micrometers; and on the primer layer and composed of 10 to 30 wt. % of a filler for improving the thermal conductivity and wear resistance, 10 to 30 wt. % glass fibers and 40 to 80 wt. % polytetrafluoroethylene (PTFE).

2. The material for sliding surface bearings according to claim 1, wherein the primer layer comprises embedded particles of PTFE, and wherein the coating is sintered and the embedded particles of PTFE are sintered to adjacent PTFE particles of the coating composes of PTFE, filler and glass fibers.

3. The material for sliding surface bearings according to claim 2, wherein the primer layer comprises of 90 to 110 parts by weight of a PTFE dispersion, 10 to 30 parts by weight of chromium phosphate and 20 to 50 parts by weight of distilled water.

4. A method of making sheet material for sliding surface bearings comprising the steps of providing an expanded metal mesh of a wrought aluminum alloy having an elongation at break $\delta_5 = 8$ to 20% and a Brinell Hardness Number HB of 35 to 65; coating the surface of the mesh with a primer layer having a thickness of 2 to 10 micrometers coating the mesh and primer layer with 10 to 30 wt. % of a filler for improving the thermal conductivity and wear resistance, 10 to 30 wt. % glass fibers and 40 to 80 wt. % polytetrafluoroethylene (PTFE).

5. The method according to claim 4, wherein the primer layer comprises embedded particles of PTFE, and wherein the steps of coating the primer layer with PTFE, filler and glass fibers includes sintering to sinter adjacent PTFE particles of the primer layer and the coating thereon.

6. The method according to claim 5, wherein the step of coating with the primer layer comprises providing a mixture of 90 to 110 parts by weight of a PTFE dispersion, 10 to 30 parts by weight of chromium phosphates and 20 to 50 parts by weight of distilled water, and subsequently dried the mixture at a temperature of 230° to 300° C. for 3 to 8 minutes and sintered at a temperature of 380° to 410° C. for 4 to 10 minutes.

* * * * *